United States Patent [19]

Babus et al.

[11] 4,325,641
[45] Apr. 20, 1982

[54] CONVERSION TANK FOR RECYCLING ASPHALTIC SHINGLE TABS

[75] Inventors: Stephen R. Babus, Cliffwood Rd., Chester, N.J. 07930; George T. Tucker, 25 Robinhood La., Chatham, N.J. 07928

[73] Assignees: Stephen R. Babus, Chester; George T. Tucker, Chatham, both of N.J.

[21] Appl. No.: 92,346

[22] Filed: Nov. 8, 1979

[51] Int. Cl.³ .................. B28C 7/04; B01F 15/02; B01F 15/04; B01F 15/06
[52] U.S. Cl. .................. 366/18; 366/23; 366/24; 366/145; 366/147; 366/184; 241/46.17
[58] Field of Search .................. 366/22, 23, 24, 25, 366/16, 8, 18, 7, 19, 64, 51, 144, 145, 148, 149, 137, 160, 159, 136, 161, 279; 126/343, 5 A; 241/46.17

[56] References Cited

U.S. PATENT DOCUMENTS

| | | |
|---|---|---|
| 912,126 | 2/1909 | Hassam . |
| 1,265,259 | 5/1918 | Schutte . |
| 1,290,954 | 1/1919 | Ford . |
| 1,378,637 | 5/1921 | Wall . |
| 1,530,895 | 3/1925 | Headley . |
| 1,541,849 | 6/1925 | Reynolds . |
| 1,732,281 | 10/1929 | Robinson . |
| 2,016,306 | 10/1935 | Watts . |
| 2,368,371 | 1/1945 | Minge . |
| 2,376,447 | 5/1945 | Mullin . |
| 3,457,136 | 7/1969 | Zaadnoordijk . |
| 3,615,804 | 10/1971 | Defregger . |
| 3,894,724 | 7/1975 | Connaughay .................. 366/25 |
| 3,997,355 | 12/1976 | Santucci . |

Primary Examiner—Robert W. Jenkins
Attorney, Agent, or Firm—Pennie & Edmonds

[57] ABSTRACT

An apparatus for and a method of recycling asphaltic waste shingles. The apparatus includes an elongated conversion tank into which an asphaltic oil, preferably preheated, and shingle tabs are admitted. The shingle tabs are dissociated into substantially liquified and solid shingle materials. The dissociated shingles are agitated with the asphaltic oil to form a slurry which can be drawn off and discharged to a work station. During the agitation, the substantially solid shingle materials are shredded to reduce their size. Preferably, the asphaltic oil is of a higher penetration grade than the asphaltic content of the shingles when in a substantially liquified form.

23 Claims, 5 Drawing Figures

CONVERSION TANK FOR RECYCLING ASPHALTIC SHINGLE TABS

TECHNICAL FIELD

This invention relates to a method of and an apparatus for recycling asphaltic waste material and in particular to recycling asphaltic shingle tabs for use in roadway construction.

BACKGROUND ART

During the manufacture of certain asphaltic products, e.g., shingles, it is known that a significant amount of waste material is developed. In the case of shingles, waste material results not only from the creation of broken or defective shingles but also from the trimmings and cutouts which naturally arise during the production of finished shingles. Generally, this waste material has been discarded in dumps where it presents both an ecological and environmental problem.

Despite attempts to recycle asphaltic waste material, such as those methods described in U.S. Pat. Nos. 1,290,954 to Ford; 1,732,281 to Robinson; and 2,368,371 to Minge et al., no commercially practical solution has been achieved for recycling asphaltic waste material particularly for use in roadway construction, e.g., road beds, parking lots, driveways, etc. Generally, the methods of the first two patents mentioned above are directed to reclaiming asphaltic waste material for use in molding other asphaltic products such as battery cases or waterproof containers. The Minge et al. patent refers to a process for reclaiming asphaltic waste material wherein the material is first reduced to a finely comminuted form and then intermixed with melted asphalt.

However, these attempts have proved inadequate for reclaiming waste material for roadway construction purposes because such use requires a certain consistency of asphalt which is not available in the asphaltic content of most waste materials.

Applicant has invented an improved method of and apparatus for recycling asphaltic waste materials into a suitable state which can be reintroduced as a binding agent for roadway construction purposes.

DISCLOSURE OF INVENTION

In accordance with the present invention, an apparatus for recycling waste asphaltic shingles in a solid form for use in roadway construction, comprises an elongated conversion tank having an inlet disposed at an upper portion of one end of the tank and an outlet disposed at a lower portion of the other end of the tank. The tank defines a first station adjacent the inlet and a communicating second station adjacent the outlet. The inlet allows for passage of the shingles into the tank. A means is provided for injecting a predetermined amount by weight of an asphaltic oil which is of a lighter viscosity grade than that of the shingles when in a substantially liquified form. Another means provides for heating the asphaltic oil and the asphaltic content of the shingles at least at the first station into a slurry. Preferably, temperature regulating means provide for measuring and maintaining the temperature of the slurry at a temperature of about 300 degrees Fahrenheit. The shingles are dissociated into substantially liquified shingle material and substantially solid shingle material in the slurry which passes from the first to the second station. An agitating means intermixes the asphaltic oil and the substantially liquified and solid shingle materials within the tank. The agitating means is adapted for shredding the substantially solid shingle material to portions of a smaller sized dimension. A discharging means provides for selective delivery to either a work station or a storage tank for later use. In addition, a means is provided for returning at least a portion of the discharged slurry to the tank.

In an exemplary embodiment, the discharging means comprises a suction type pump which is adapted to further shred the substantially solid shingle material passing therethrough into yet smaller dimensioned portions. The discharging means also includes a valve means for selectively regulating flow of the slurry through the outlet and to the returning means. The latter includes at least one pipe disposed within and longitudinally of the tank and having a plurality of perforations. The agitating means comprises a plurality of flat-ended tapered nozzles situated at each of the perforations. For this reason, the slurry exits therefrom with an increased speed so as to both agitate the slurry and shred the remaining portions of substantially solid shingle material. Certain of the nozzles adjacent the outlet extend generally toward the outlet so as to direct the slurry thereto. The agitating means further comprises a fan-like blade disposed centrally of a bottom portion of the tank and a means for rotationally driving the blades. A monitoring means provides for the weighing of the shingles admitted into the tank. Also, the monitoring means is adapted to control the injection means so as to regulate the rate and amount of lighter viscosity grade asphalt injected into the tank in accordance with a predetermined ratio which preferably is equal to approximately one.

The present invention also relates to a method of recycling asphaltic waste shingles and comprises injecting a preferably preheated asphaltic oil of a lighter viscosity grade than that of the asphaltic content of the shingles when in a substantially liquified form into a mixing stage. The shingles in solid form are then admitted into the mixing stage. The asphaltic oil and the shingles are heated so as to form a slurry and the shingles are dissociated into substantially liquified and solid shingle material. The slurry is agitated so as to intermix the asphaltic oil and the substantially liquified and solid shingle material and to shred the substantially solid shingle material. Finally, the slurry is discharged from the mixing stage. Preferably, at least a portion of the slurry can be selectively returned to the mixing stage.

In addition, the present invention relates to an end product of recycled asphaltic shingles which comprises by weight about 50 percent of asphaltic shingles dissociated into substantially liquified and solid shingle material and about 50 percent of an asphaltic oil having a lower viscosity grade than that of the asphaltic content of the shingles when in a substantially liquified form.

BRIEF DESCRIPTION OF THE DRAWINGS

The present invention is described in detail below with reference to the drawings in which.

BEST MODE FOR CARRYING OUT THE INVENTION

Figure 1:
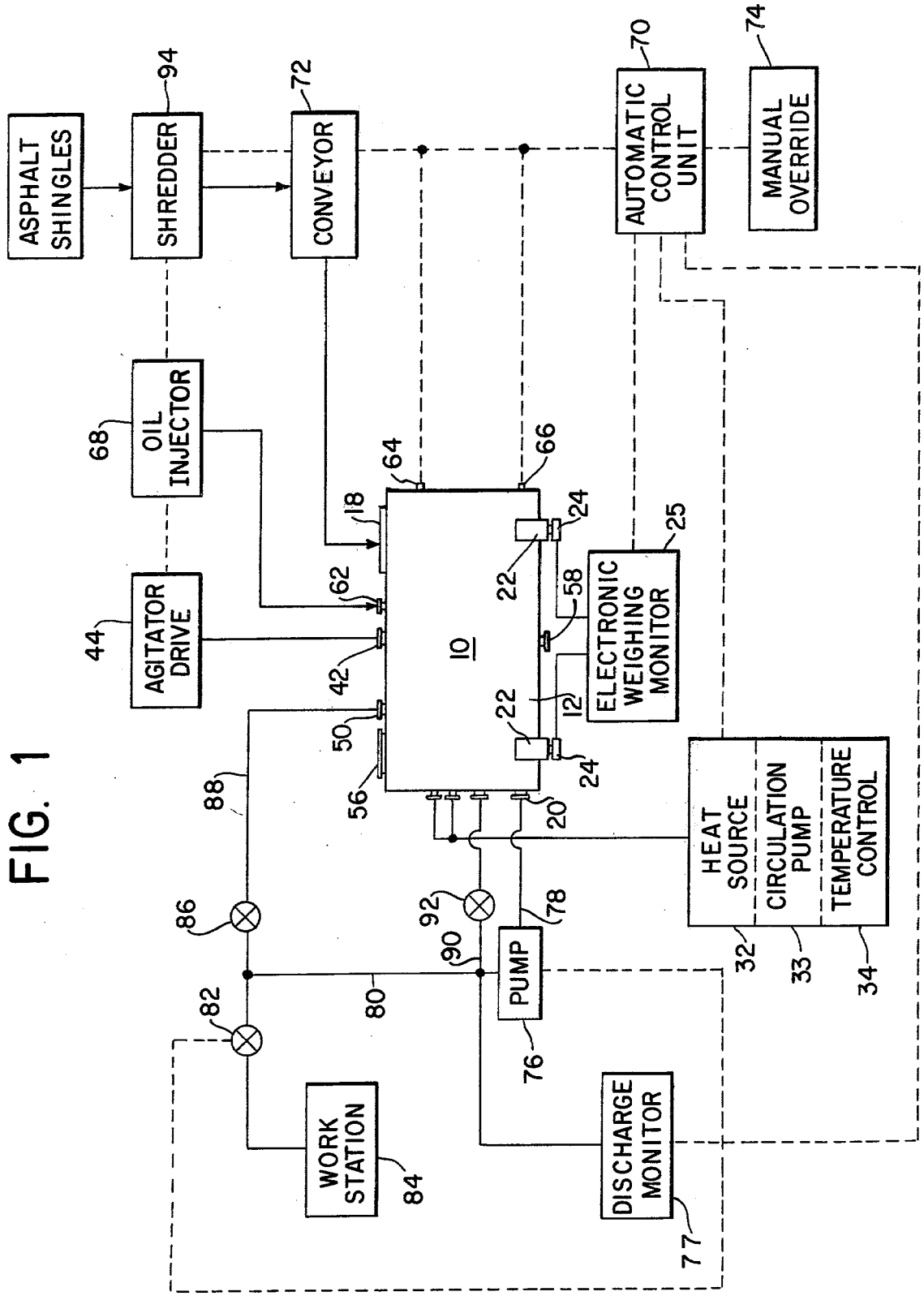
FIG. 1 is a schematic view of an apparatus including a tank for recycling waste asphaltic shingles according to the present invention.

Referring to the drawings, FIG. 1 is a schematic drawing illustrating an apparatus including a conversion tank 10 for recycling waste asphaltic shingles in a solid form for use in roadway construction. The tank 10, shown in an end sectional view in FIG. 2, consists of a cylindrical shell 12 having end walls 14 and 16. Preferably the shell 12 is elongated. At an upper portion at one end, the tank 10 has an inlet 18 through which waste asphaltic shingles in solid form may be admitted into the tank 10. At a lower portion of the other end of the tank, an outlet 20 is positioned to discharge material from the tank.

The tank 10 is supported by two generally rectangular base pads 22 positioned underneath and adjacent the opposite ends of the tank 10. The upper portion of each pad 22 is cradled to receive the tank 10. The base pad 22 adjacent the outlet end is smaller in height than the base pad 22 adjacent the inlet end. For this reason, the tank 10 is tilted toward the outlet 20 at a prescribed pitch, so as to permit material within the tank to move toward the outlet 20 under the force of gravity.

A means 21 is provided adjacent the outlet 20 for collecting any metallic materials that may enter the tank 10. Preferably, the collecting means 21 is a magnet or alternatively a sieve which would retain relatively large metallic materials from entering the outlet 20.

Each of the base pads 22 is positioned atop two load cells 24 which provide a measure of the weight of the tank 10 and its contents. Typical load cells 24 produce an electrical signal which is indicative of the weight measured. The outputs of the four load cells beneath the tank 10 are preferably integrated by a suitable electronic weighing monitor 25 which includes a visual readout such as a digital display to permit immediate registry of the total weight atop the four load cells. Preferably, the electronic means permits calibration so as to remove the weight of the tank 10 and supporting structure from the readout and thus provide a true measure only of the weight of the contents in the tank 10. Typical highly accurate load cells 24 can be of the strain gauge type which modulates an electrical signal as a function of the strain impressed on the load cell or of the hydraulic type which converts the weight or force into a hydraulic pressure that by means of an electrical transducer can be changed into an electrical signal.

Figure 2:
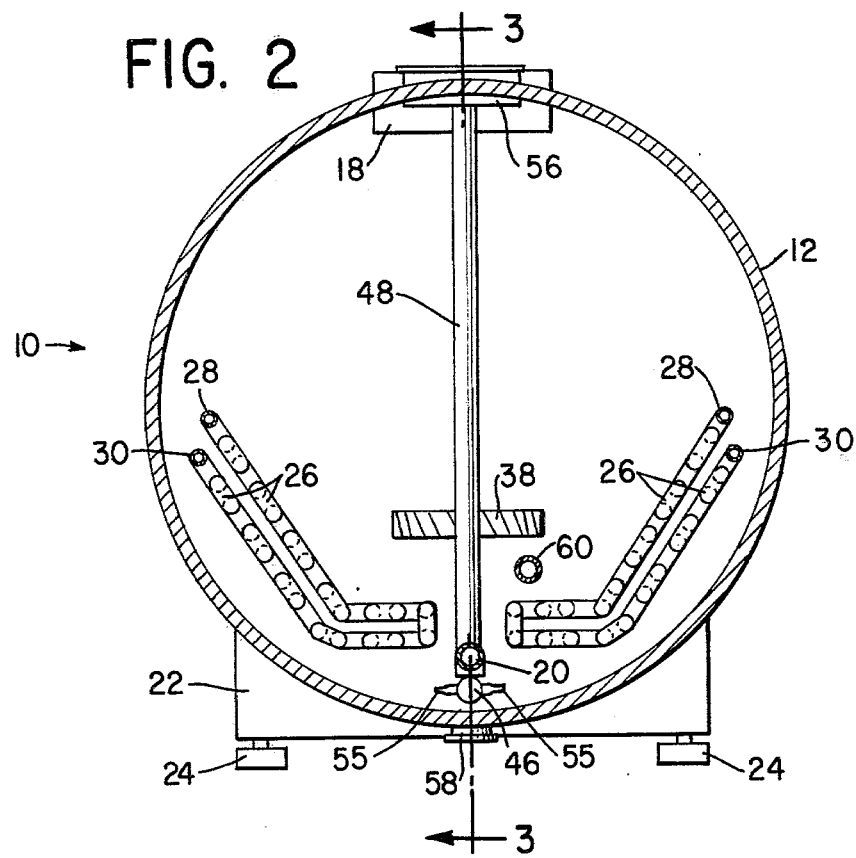
FIG. 2 is an end sectional view of the tank of FIG. 1.
Figure 3:
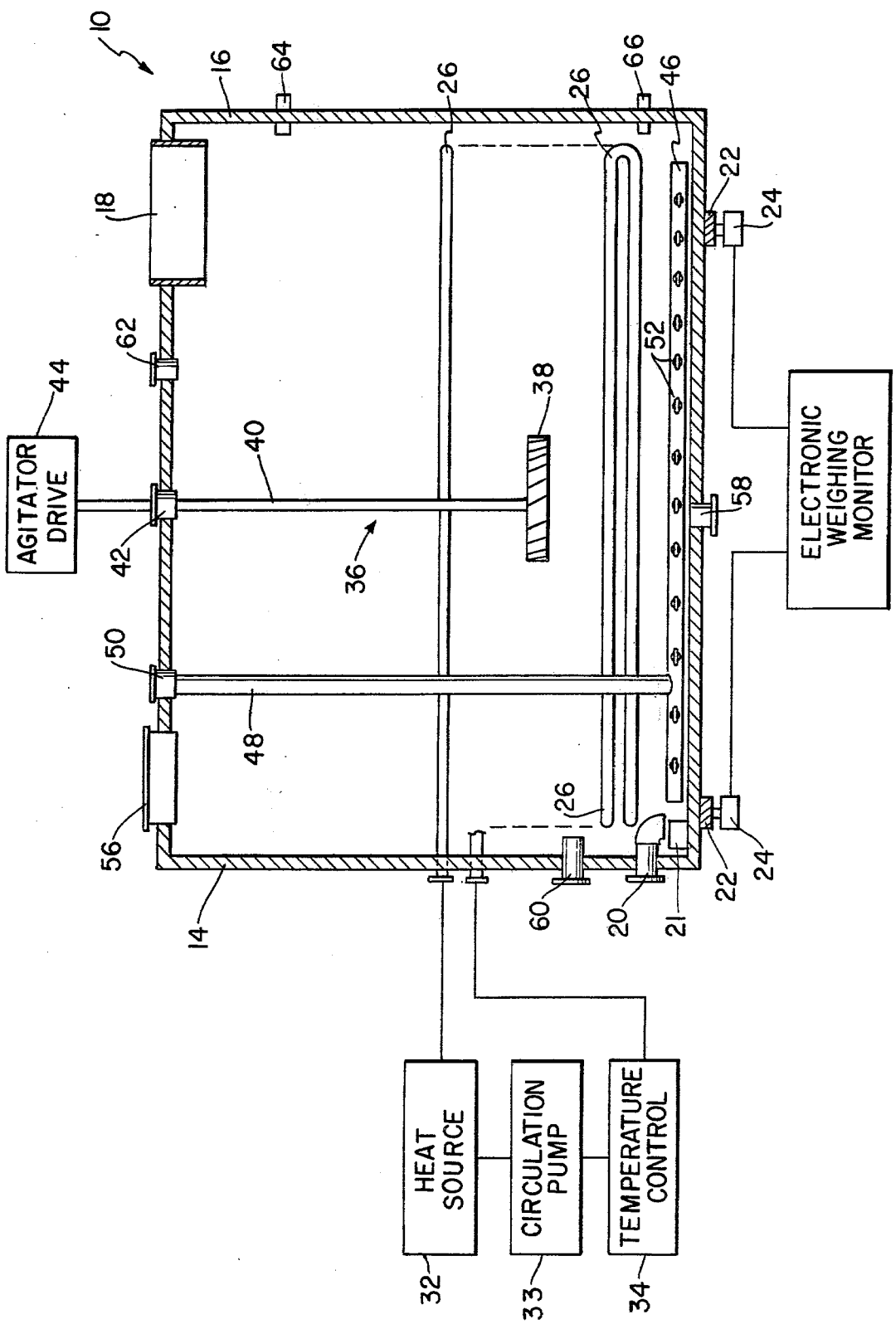
FIG. 3 is a side elevational view in cross-section along line 3—3 of the tank of FIG. 2.

The interior of the tank 10 contains two series of double-layered convoluted heat tubing 26 each of which is disposed along the interior walls of the tank 10 as illustrated in FIGS. 2 and 3. The tubing 26 is separated so as to permit material within the tank 10 to pass through the spacing between the tubing 26. The heat tubing 26 has an input port 28 and a return port 30 through which the heating medium passes from a remote heat source 32 shown schematically in FIG. 1. Preferably the heating medium is superheated oil which is circulated through the heat tubing 26 by means of a suitable circulation pump 33. The temperature of the heating medium is thermostatically monitored and regulated by a temperature control 34 provided in the line passing from the heat source to the tubing 26. Preferably, both tubings 26 will be charged with the heating oil. However, if desired, either one of the tubings 26 can be operated independently of the other. The heat tubing 26 provides for the heating of an asphaltic oil injected into the tank as described below and solid shingles admitted through inlet 18 into a slurry.

The interior of the tank 10 also contains a turbine agitator 36 for mixing and agitating the slurry within the tank 10. The agitator 36 includes a fan-like blade 38 attached to the end of a shaft 40 extending through a port 42 in the top central portion of the tank 10. The shaft is rotatably driven by an agitator drive 44. The blades 38 are adjustable to provide any desired pitch or slant of the blades 38. In this fashion, variations in the flow pattern of the slurry within the tank 10 are obtainable. The agitator drive 44 includes a sensor control which determines if the slurry within the tank 10 falls below the level of the blades 38. If the blades 38 are determined to be above the slurry, the sensor control will automatically shut off the drive means 44 to prevent an overload from occurring.

A return pipe 46 is disposed longitudinally along the bottom of tank 10 and is connected to a vertical feed-in pipe 48 at a point on the return pipe 46 adjacent the outlet 20. The feed-in pipe 48 enters the tank 10 through a port 50 in the top of the tank 10 adjacent the outlet end. The return pipe 46 is in communication with the outlet 20 as shown schematically in FIG. 1 so that the slurry may be selectively returned to the tank 10.

Figure 4:
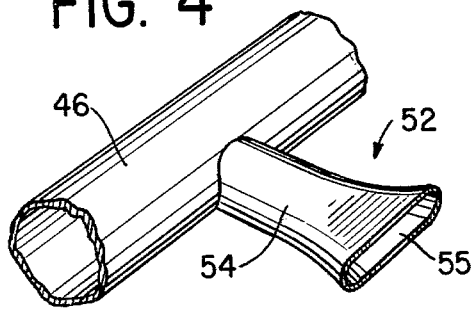
FIG. 4 is a perspective view of a portion of a return pipe and an attached nozzle according to the present invention.
Figure 5:
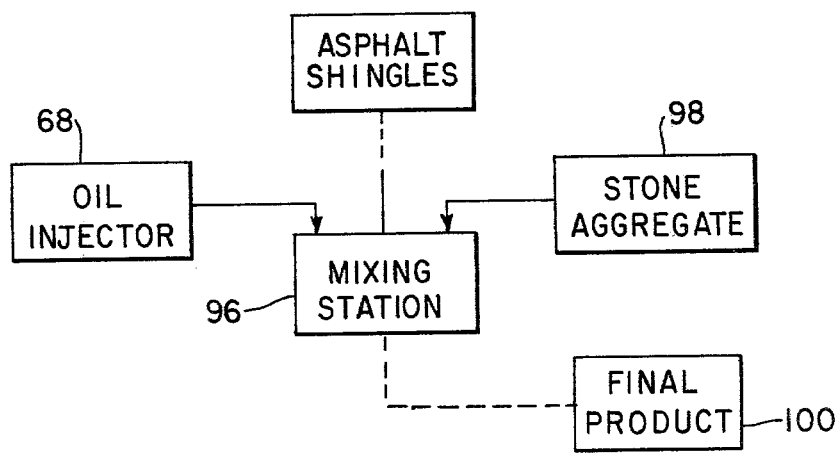
FIG. 5 is a schematic view of an alternative embodiment of an apparatus according to the present invention.

The return pipe 46 has a plurality of perforations extending on opposite sides thereof. Each perforation is in communication with a nozzle 52 as shown in FIG. 4. The nozzle 52 consists of a tubing 54 which is flattened at its exit end 55 to provide a spray effect. In this manner, the slurry exiting from the nozzle 52 is jetted therefrom with an increased speed.

A manhole 56 is provided adjacent port 50 to permit access into the tank 10 whenever desired such as for maintenance upon shut-down. In addition, a capped port 58 is provided at a central bottom portion of the tank 10 to permit flushing of any contents within during cleaning operations. An auxiliary input port 60 is provided in end wall 14 adjacent outlet 20. An auxiliary return line, as shown in FIG. 1, enters tank 10 through port 60. The last tank 10 also has a port 62 as shown in FIG. 3 through which the asphaltic oil is injected as will be described below. Sensors 64 and 66 are provided in end wall 16 to provide an indication of the level of the slurry within the tank 10.

The apparatus of the present invention in addition to the tank 10, also includes an oil injector 68 as shown in FIG. 1 which communicates with port 62 for selective injection of the asphaltic oil into the tank. Optionally, an automatic control unit 70 can be provided and connected as shown in FIG. 1 to the high level sensor 64, the electronic weighing monitor 25, the oil injector 68, the agitator drive 44 of the turbine agitator 36, and a conveyor 72 for transporting the shingles to the inlet 18. Alternatively, the sensors 64 and 66 can be coupled to the agitator drive 44 of the turbine agitator 36 as well as the automatic control unit 70. A manual override 74 can be provided to permit manual control during any operation of the apparatus.

Also, as shown in FIG. 1, the apparatus further includes a pump 76 of the suction type for drawing off the slurry through the outlet 20 and pump line 78. Preferably the pump has a 4-inch inlet diameter. The pump 76 is adapted to further shred or mulch remaining substantially solid shingle material in the slurry drawn out of the tank 10. The pump 76 in turn is coupled to a discharge and valve system. In one operational mode, the discharge and valve system permits the slurry to be selectively delivered through station line 80 and selectively operable discharge valve 82, which is either hydraulic or pneumatic, when the latter is in an open condition. In this manner, the slurry can be discharged to a removed work station 84. Alternatively, the work station 84 may be a storage tank so as to permit later use of the slurry. A discharge monitor 77, as shown in FIG. 1, can be provided to measure the amount of slurry discharged. Also, the discharge monitor 77 can be coupled to control unit 70 to provide an input thereto.

The discharge and valve system includes primary relief valve 86 which couples with station line 80 and port 50 on tank 10 through return line 88. When the slurry is delivered to the work station 84, the pressure in station line 80 is below that required to open relief valve 86. However, closing of discharge valve 82 causes a pressure buildup in station line 80 which in turn causes relief valve 86 to open. In this fashion the slurry returns into the tank 10 through return line 88, port 50, feed-in pipe 48, and return pipe 46. In this manner, the slurry in the tank 10 will, in addition to the agitation by turbine agitator 36, be agitated by the spray from nozzles 52. Opening of discharge valve 82 will cause a pressure drop in station line 80 which in turn will again place relief valve 86 in a closed position.

However, even if the discharge valve 82 is open, it is possible that the pressure may build up in station line 80 so as to cause relief valve 86 to open and safely vent any excess pressure by allowing at least a portion of the slurry to return back into tank 10. An auxiliary return line 90 coupled to auxiliary input port 60 and provided with auxiliary relief valve 92 can prevent excessive pressure buildup in excess of what is necessary to open relief valve 86. Auxiliary relief valve 92 operates in the same fashion as relief valve 86 except that its opening will occur at an exceedingly high predetermined pressure.

The pump 76, as well as discharge valve 82, if desired, can be coupled to the control means 70 and thereby to the manual override 74 to provide a central point of control for all operational aspects of the apparatus.

All couplings to the ports on tank 10 are made of flexible connections so as to isolate or minimize transfer of tank vibrations to the discharge and valve system.

In operation, the tank 10 would first be filled to a predetermined level with an asphaltic oil by the oil injector 68 preferably above the blades 38 of turbine agitator 36 and above the heat tubing 26. The amount of oil injected can be preset by the automatic control unit 70 which will shut off the oil injector 68 when the predetermined amount is obtained as determined by the electronic weighing monitor 25. Preferably the oil is superheated to a temperature between about 375 degrees to 400 degrees Fahrenheit. The asphaltic oil is of a lighter viscosity grade or higher penetration grade than that of the asphaltic content of the shingles when in a substantially liquified form. Preferably the asphaltic oil has a grade of penetration of between about 120 to 150. The addition of the asphaltic oil renders the slurry drawn from the tank 10 suitable for roadway construction purposes inasmuch as shingles by themselves are inappropriate for such uses.

Shingles in solid form are transported to the inlet 18 by conveyor 72. A shredder 94 can be provided so as to reduce the size of the shingles prior to their passing through the inlet 18. The shingles will be continuously added to the tank 10 until the electronic weighing monitor 25 indicates to the control unit 70 that a predetermined ratio by weight of shingles to asphaltic oil is achieved. The predetermined ratio is dependent upon the desired asphaltic viscosity of the end product discharged from the tank. Preferably, the ratio is approximately equal to one when the asphaltic oil has a grade of penetration of between about 120 to 150. A typical batch of slurry for tank 10 having about a 9 foot diameter and a length of about 13 feet is approximately 10,000 pounds which therefor consists of approximately 5,000 pounds each of solid shingles and asphaltic oil.

Upon falling into the tank 10, the shingles are subjected to the heat provided by the superheated oil and the heat tubing 26. The shingles are dissociated by means of the heat into their consitutent components, i.e., substantially liquified shingle material which primarily is the asphaltic content and substantially solid shingle material such as stone, granules, felt material, fibreglass, mineral fillers and other binder composition. As a result, a slurry is created composed of the shingles and the asphaltic oil. The other temperature of the slurry is maintained by means of the temperature control 34 at about 300 degrees Fahrenheit. This is the optimum temperature at which the slurry must be maintained.

The turbine agitator 36, which operates after the asphaltic oil enters the tank 10, continuously stirs the slurry to achieve a homogenous composition and prevents any agglomerations from occurring. Agitation is also provided by any slurry returning to the tank 10 through the nozzles 52. The slurry passing through nozzles 52 helps to prevent any agglomerations on the bottom of the tank 10, aid in directing the slurry toward the outlet 20, and help to further shred any substantially solid shingle material into portions of a smaller sized dimension.

After a prescribed time period as provided by the control unit 70, the slurry is drawn out of the tank 10 and discharged as described above. If desired, a small portion of the slurry can be discharged at the work station 84 and tested for desirability. If not suitable or desirable, the discharge valve 82 can be closed whereupon the slurry will be returned to the tank 10 for additional agitation of the slurry's composition and mulching of the substantially solid shingle material.

As stated above, the entire operation of the apparatus can be regulated automatically by the control unit 70. However, the manual override 74 permits manual control of any stage of the operation of the apparatus.

According to the present invention, the shingles in the tab form can be added directly to a mixing station 96, preferably of the drum mixer or pug mill mixer type. The required asphaltic oil, preferably preheated, is supplied by the oil injector 68. Also, a predetermined amount of crushed stone or aggregate, preferably preheated, from supply 98 is admitted into the mixing station 96. The contents of the mixing station 96 are then heated and or mixed. The final asphaltic product 100 comprises an intermixed first portion of dissociated asphaltic shingles and asphaltic oil, and a second portion of aggregate or stone. The predetermined amount of aggregate or stone which is added is dependent upon the desired type of final asphaltic product 100 discharged from the mixing station 96. All the other components, such as the electronic weighing monitor 25, control unit 70, and discharge and valve system, as described above can be incorporated to increase the complexity of the apparatus in varying degrees. For this reason no further discussion will be presented here.

The end or final product according to the present invention has been found to be highly suitable for roadway construction. The end or final product because of its solid components in addition to the asphaltic content is a suitable and durable substitute for pure road asphalt as presently known and used. In addition, the economics involved also adds to the desirability of the end product involved.

We claim:

1. An apparatus for recycling asphaltic waste material comprising:
   a. a tank having an inlet and an outlet, said inlet allowing for passage into said tank of the asphaltic waste material;
   b. means for initially injecting a predetermined amount of weight of an asphaltic oil into said tank, said asphaltic oil having a grade of penetration greater than the asphaltic content of the waste material when in a substantially liquified form;
   c. means for monitoring the weight of the contents of said tank such that a predetermined ratio of the amount by weight of asphaltic waste material to that of asphaltic oil is achieved upon selective admission of the amount of asphaltic waste material into said tank;
   d. means for heating said asphaltic oil and the asphaltic waste material within said tank to form a slurry, the asphaltic waste material being dissociated into substantially liquified asphaltic waste material and substantially solid asphaltic waste material;
   e. means for agitating said slurry within said tank so as to intermix said asphaltic oil and substantially liquified and solid asphaltic waste material; and
   f. means for discharging said slurry from said tank through said outlet.

2. The apparatus according to claim 1 wherein said agitating means is adapted for shredding said substantially solid asphaltic waste material in said slurry into portions of a smaller sized dimension.

3. The apparatus according to claim 1 wherein said discharging means includes a pump adapted for shredding said substantially solid asphaltic waste material in said slurry into portions of a smaller sized dimension.

4. The apparatus according to claim 1 further including means for returning at least a portion of said discharged slurry to said tank.

5. A conversion tank for recycling waste asphaltic shingles in a solid form for use in roadway construction, comprising:
   a. an elongated tank having an inlet disposed at an upper portion of one end of said tank and an outlet disposed at a lower portion of the other end of said tank, said tank defining therein a first station adjacent said inlet and a communicating second station adjacent said outlet, said inlet allowing for passage of the shingles into said tank;
   b. means for injecting into said tank a predetermined amount by weight of an asphaltic oil being of a lighter viscosity grade than the asphaltic content of the shingles when in a substantially liquified form;
   c. means for heating said asphaltic oil and the shingles at least at said first station into a slurry, the shingles being dissociated into substantially liquified shingle material and substantially solid shingle material, said slurry passing from said first to said second station;
   d. means for agitating said slurry within said tank so as to intermix said asphaltic oil and substantially liquified and solid shingle material, said agitating means adapted for shredding the substantially solid shingle material into portions of a smaller sized dimension;
   e. means for discharging said slurry from said tank through said outlet; and
   f. means for returning at least a portion of said discharged slurry to said tank.

6. The conversion tank according to claim 5 wherein said heating means comprises at least one tube disposed at least at said first station of said tank and adapted for passage of a heated fluid therethrough.

7. The conversion tank according to claim 6 wherein said heated fluid is at least one of heated steam, water, and oil.

8. The apparatus according to claim 6 further comprising means for regulating the temperature of said slurry, said temperature regulating means comprising means for measuring the temperature of the slurry and controlling said heating means to maintain the temperature of said slurry at about 300 degrees Fahrenheit.

9. The conversion tank according to claim 8 wherein said temperature measuring means comprises at least one thermocouple disposed within said tank and in contact with said slurry.

10. The conversion tank according to claim 5 wherein said discharging means comprises:
    a. a pump means in communication with said outlet for withdrawing said slurry from said tank through said outlet; and
    b. valve means for selectively regulating flow of said slurry through said outlet and to said returning means.

11. The conversion tank according to claim 10 wherein said discharging means further comprises means for metering the discharge of said slurry from said outlet.

12. The conversion tank according to claim 10 wherein said pump means includes a pump of the suction type for shredding any remaining portions of substantially solid shingle material passing therethrough into portions of a yet smaller dimension.

13. The conversion tank according to claim 12 wherein said pump has preferably a 4-inch diameter inlet.

14. The conversion tank according to claim 5 wherein said returning means comprises at least one pipe in communication with said outlet and having at least one perforation, said pipe being disposed within said tank at a bottom portion thereof and extending longitudinally of said tank, said pipe having a closed end disposed adjacent said first station of said tank.

15. The conversion tank according to claim 14 wherein said pipe includes a plurality of perforations to permit said slurry to pass from said pipe into said tank.

16. The conversion tank according to claim 15 wherein said agitating means comprises a plurality of tapered nozzles disposed at each of said perforations such that said slurry exists therefrom with increased speed so as to agitate said slurry within said tank and to shred said substantially solid shingle material into portions of a smaller sized dimension.

17. The conversion tank according to claim 16 wherein said agitating means includes at least a first and a second row of said tapered nozzles disposed longitudinally of said pipe and being generally transverse of said pipe, said nozzles each having a flattened end so as to provide a spray of exiting slurry therefrom.

18. The conversion tank according to claim 17 wherein a first plurality of the tapered ends of said nozzles adjacent said outlet extends generally toward said outlet so as to direct said slurry thereto and a second plurality of the tapered ends of said nozzles extend generally transverse of said pipe.

19. The conversion tank according to claim 5 wherein said agitating means comprises a fan-like blade disposed centrally of a bottom portion of said tank, and a means for rotationally driving said blade so as to stir said slurry within said tank.

20. The conversion tank according to claim 5 further comprising means for monitoring the weight of the shingles admitted into said tank, and controlling said injection means so as to regulate the rate and amount of said lighter viscosity grade asphaltic oil injected into said tank in accordance with a predetermined ratio of the weight of lighter viscosity grade asphaltic oil to the weight of shingles admitted into said tank.

21. The conversion tank according to claim 20 wherein the ratio is approximately equal to one.

22. The conversion tank according to claim 21 wherein said lighter viscosity grade asphaltic oil has a penetration grade of between about 120 to about 150 or higher.

23. The conversion tank according to claim 5 further comprising means for shredding the shingles, said shredding means being in communication with said inlet and being operable so as to reduce the size of the shingles prior to passage through said inlet.

* * * * *

UNITED STATES PATENT AND TRADEMARK OFFICE
CERTIFICATE OF CORRECTION

PATENT NO. : 4,325,641
DATED : April 20, 1982
INVENTOR(S) : Stephen R. Babus and George T. Tucker It is certified that error appears in the above—identified patent and that said Letters Patent is hereby corrected as shown below:

On the title page,

Item [73] should read instead as

-- Tri-County Asphalt Corporation, Roseland, New Jersey --.

Signed and Sealed this

Second Day of November 1982

[SEAL]

Attest:

GERALD J. MOSSINGHOFF

Attesting Officer

Commissioner of Patents and Trademarks